US007657124B2

(12) United States Patent
Turner et al.

(10) Patent No.: US 7,657,124 B2
(45) Date of Patent: Feb. 2, 2010

(54) MULTIPLE IMAGE DATA SOURCE INFORMATION PROCESSING SYSTEMS AND METHODS

(75) Inventors: Robert W. Turner, Federal Way, WA (US); Pauline Joe, Renton, WA (US); James J. Rustik, Kent, WA (US); Bryan R. Smith, Kent, WA (US)

(73) Assignee: The Boeing Company, Chicago, IL (US)

( * ) Notice: Subject to any disclaimer, the term of this patent is extended or adjusted under 35 U.S.C. 154(b) by 727 days.

(21) Appl. No.: 10/789,084

(22) Filed: Feb. 27, 2004

(65) Prior Publication Data

US 2005/0193008 A1  Sep. 1, 2005

(51) Int. Cl.
G06K 9/54 (2006.01)
G06K 9/32 (2006.01)
(52) U.S. Cl. ....................... 382/305; 382/294
(58) Field of Classification Search ................ 382/305, 382/107, 109, 110, 294, 100; 707/1–7, 10, 707/104.1; 702/2, 5; 705/10, 4
See application file for complete search history.

(56) References Cited

U.S. PATENT DOCUMENTS

| | | | | |
|---|---|---|---|---|
| 4,912,770 A * | 3/1990 | Seto et al. | ............ | 382/107 |
| 5,124,915 A | 6/1992 | Krenzel | | |
| 5,422,989 A * | 6/1995 | Bell et al. | ............ | 345/689 |
| 5,550,937 A | 8/1996 | Bell et al. | | |
| 5,652,717 A | 7/1997 | Miller et al. | | |
| 5,652,881 A | 7/1997 | Takahashi et al. | | |
| 5,682,034 A | 10/1997 | Schueler | | |
| 5,864,632 A * | 1/1999 | Ogawa et al. | ............ | 382/113 |
| 5,995,681 A | 11/1999 | Lee et al. | | |
| 6,011,875 A | 1/2000 | Laben et al. | | |
| 6,097,835 A | 8/2000 | Lindgren | | |
| 6,332,146 B1 * | 12/2001 | Jebens et al. | ............ | 707/104.1 |
| 6,463,426 B1 * | 10/2002 | Lipson et al. | ............ | 707/3 |
| 6,477,270 B1 | 11/2002 | Wu | | |
| 6,549,852 B2 * | 4/2003 | Hanson | ............ | 702/2 |
| 6,643,641 B1 * | 11/2003 | Snyder | ............ | 707/4 |
| 6,973,384 B2 * | 12/2005 | Zhao et al. | ............ | 701/117 |
| 6,987,877 B2 | 1/2006 | Paz-Pujalt et al. | | |
| 6,995,686 B2 * | 2/2006 | Gosdin et al. | ............ | 340/905 |
| 7,031,927 B1 * | 4/2006 | Beck et al. | ............ | 705/7 |
| 7,171,912 B2 | 2/2007 | Fraisse et al. | | |
| 2002/0143950 A1 * | 10/2002 | Kenner et al. | ............ | 709/227 |
| 2003/0195838 A1 * | 10/2003 | Henley | ............ | 705/37 |
| 2004/0073538 A1 | 4/2004 | Leishman et al. | | |
| 2004/0110515 A1 * | 6/2004 | Blumberg et al. | ............ | 455/456.1 |
| 2004/0123129 A1 * | 6/2004 | Ginter et al. | ............ | 713/193 |

\* cited by examiner

*Primary Examiner*—Sherali Ishrat

(57) ABSTRACT

Systems and methods for providing image data/information products to customers are provided. A data management facility generates a graphical user interface that is viewed by customers on computer systems coupled to a processor of the data management facility over a network. The graphical user interface allows a customer to search at least one of stored image data/information products or algorithms, to select at least one of the stored image data/information products or algorithms, and to select a desired geographic location. The data management facility generates a data/information product based on the selected image data/information product and the selected geographic location, and receives a request for an image data/information product, if a desired image data/information product cannot be found in the data management facility. In addition, the processor sends the generated image data/information product to the customer and bills the requestor based on the generated image data product.

17 Claims, 8 Drawing Sheets

MULTIPLE IMAGE DATA SOURCE INFORMATION PROCESSING SYSTEMS AND METHODS

FIELD OF THE INVENTION

This invention relates generally to processing information and, more specifically, to processing image information from multiple data sources.

BACKGROUND OF THE INVENTION

Many applications exist for information products based on remotely sensed data. Typically, the information includes satellite images. Often, it is desirable to update the satellite images to reflect changes in the sensed subject matter over time. However, customers currently are limited to information products derived from one or two remotely sensed data sources that may not provide a desired update frequency.

For example, a farmer may desire information about two different crops the farmer has planted. The farmer finds a first organization that provides satellite image information about the first crop, but the first organization does not have the ability to provide satellite image information about the second crop of the farmer. The farmer must search for an organization that produces the information desired or must find an organization that will create an algorithm for producing the desired information. This is a great waste of the farmer's time.

Therefore, there exists an unmet need for easy to access remotely sensed data (such as satellite image data products) acquired from different organizations and different satellite sources.

SUMMARY OF THE INVENTION

The present invention provides systems and methods for easily accessing image data products and information derived from the image data that are created from different data sources and different image processing entities.

An exemplary system includes a delivery unit, a network, and a data management facility. The data management facility includes a database that stores image data products and information, a database that stores image data product and information extraction algorithms, and a processor coupled to the databases and the network. The processor generates a graphical user interface that is viewed by customers on computer systems coupled to the processor over the network. The graphical user interface allows a customer to search at least one of the stored image data/information products or algorithms, allows a customer to select at least one of the stored image data/information products or algorithms, and allows a customer to select a desired geographic location. The processor generates a data/information product based on the selected image data/information product and the selected geographic location, and receives a request for an image data/information product, if a desired image data/information product can not be found in the database. In addition, the processor sends the generated image data/information product to the customer and bills the requestor based on the generated image data or extracted information product.

In another aspect of the invention, the processor instructs one or more of a plurality of remote sensing data sources to generate one or more images based on the selected image data/information product and the selected geographic location, receives the generated one or more images, and generates the desired image data/information product based on an imaging or information extraction algorithm associated with the selected image data/information product and stored in an algorithm database.

In still another aspect of the invention, the processor sends reimbursement to an owner of the algorithm that was used to generate the selected image data/information product based on a reimbursement contract.

In a further aspect of the invention, the processor performs at least one of electronically sending the image data/information product to the requestor over the network, printing a hard copy, and storing on a portable memory device.

In yet another aspect of the invention, the processor sends a request to the delivery unit to transport the hard copy or portable memory device to the requester.

In a yet further aspect of the invention, the plurality of remote sensing data sources includes a LandSat5 system, a LandSat7 system, a MODIS system, aircraft system, ground based system, or a SPOT system.

BRIEF DESCRIPTION OF THE DRAWINGS

The preferred and alternative embodiments of the present invention are described in detail below with reference to the following drawings.

FIGS. 3-6 illustrate portions of a graphical user interface for allowing a user to perform the process shown in FIGS. 2A and 2B by using the system shown in FIG. 1.

DETAILED DESCRIPTION OF THE INVENTION

Figure 1:
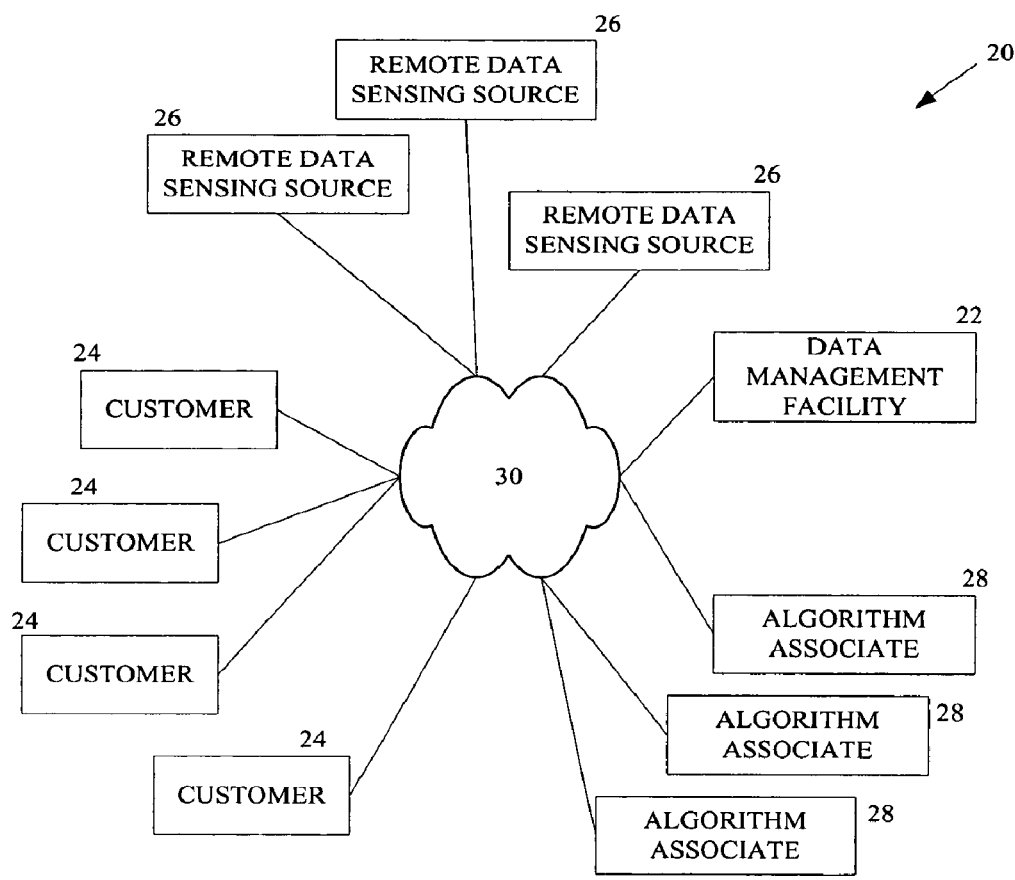
FIG. 1 is a block diagram of an exemplary system formed in accordance with an embodiment of the present invention.

As shown in FIG. 1, a system 20 allows customers to purchase image products that can arrive from various remote data sensing sources and that are manipulated by predefined algorithms or algorithms from outside sources. Thus, the system 20 allows for a customer to go to a single source in which to receive processed remotely sensed data, such as various satellite data that is processed according to the information that the customer desires from that image. In an embodiment of the present invention, the system 20 includes a data management facility 22 that is coupled to a plurality of customer systems 24, a plurality of remote data sensing sources 26, and a plurality of algorithm associate systems 28 over a network 30. The data management facility 22 manages requests from the customer's system 24 for image data/information generated by one or more of the remote sensing sources 26 and manipulated by internally derived algorithms or algorithms generated by one or more of the algorithm associate systems 28. Upon completion of a customer request, the data management facility 22 produces an information product that is delivered to the respective customer system 24 over the network 30 or via other methods, such as without limitation postal or other delivery. It will be appreciated that the network 30 is one or more of a public or private data network and that each of the components connected to the network 30 may be themselves distributed across the network 30.

The customer systems 24 may be stand-alone private computers or can be a public access computer that has a connection to the network 30. An example of the data management facility 22 is shown and described in FIG. 7 below. The remote data sensing source systems 26 include but are not limited to various types of satellites, such as without limitation the LANDSAT5, LANDSAT7, Moderate Resolution Imaging Spectroradiometer (MODIS), Satellite Pour l'Observation de La Terre (SPOT) satellites and/or various types of airborne sensors such as the SpecTerra Mark II-IV cameras and the Vision I cameras. Algorithm associate systems 28 include but are not limited to associates that are independent of the data management facility 22 but have agreed to a business relationship with respect to processing image data/information produced by the remote data sensing source systems 26 for purchase by customers.

Figure 2A:
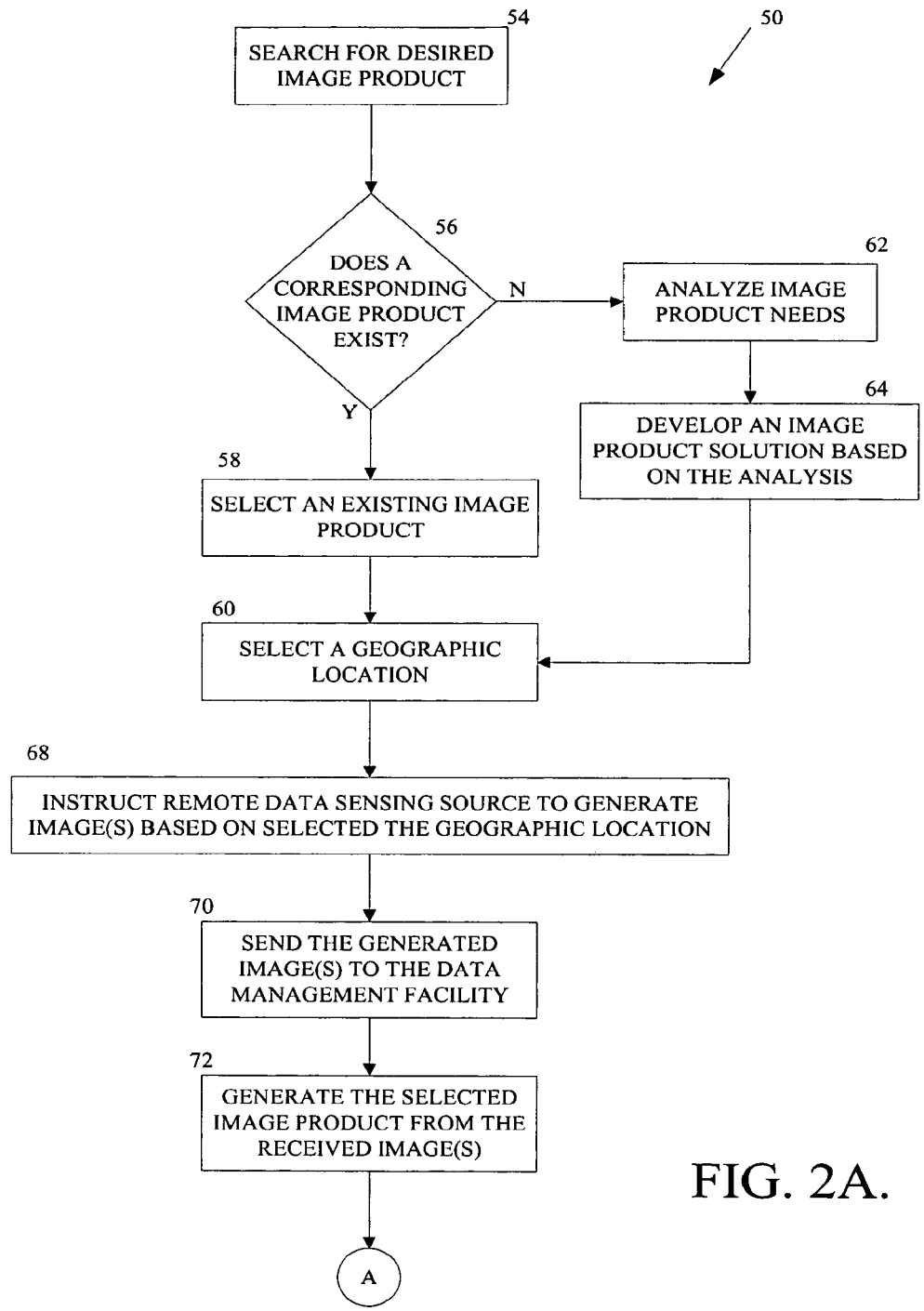
FIGS. 2A and 2B illustrate a flow diagram of an exemplary process performed by the system of FIG. 1.
Figure 2B:
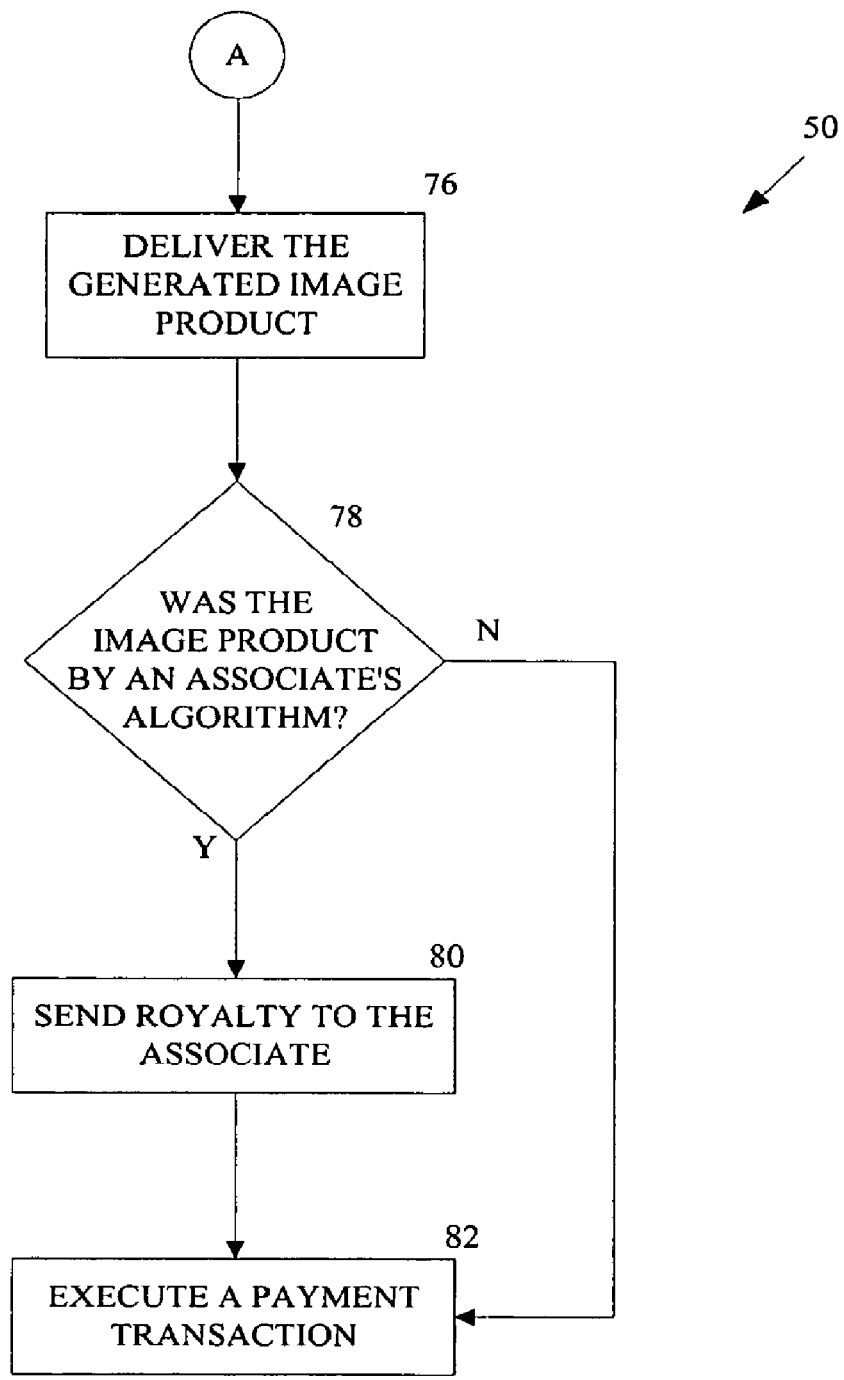

Referring to FIGS. 2A and 2B, an exemplary process 50 is performed by the system 20, specifically the data management facility 22 (FIG. 1). The process 50 begins at a block 54 where a search is initiated for a desired image/information product. The search can be performed in a number of ways. For example, a customer can use a search engine that searches for image/information products stored within a database associated with the data management facility 22. Also, the user may simply scroll through a list of image/information products that are available through the data management facility 22. At a decision block 56, if an image/information product does not exist that corresponds to what the user is searching for, then at a block 62 an analysis of the image product that the user needs is analyzed. Analysis of a customer's image product needs can be performed by a number of different methods. For example, the customer may fill out an online questionnaire that is then reviewed by personnel at the data management facility 22. Alternately, the customer may be referred to a person that the customer communicates with either via electronic mail, facsimile, or telephonically to communicate directly their needs. Once the data management facility personnel has taken the requirements of the image/information product the customer desires, then they determine how to meet those requirements. At a block 64, an image product solution is developed based on the analysis performed at the block 62.

If it was determined at the decision block 56 that an image product that is available to the data management facility 22 does exist, then the customer selects the existing image product at a block 58. After an image product is selected at the block 58 or developed at the block 64, the customer selects a geographical location for the desired image product at a block 60. At a block 68, the data management facility 22 instructs one or more of the remote data sensing sources to generate images based on the selected geographical location. At a block 70, the generated images are sent to the data management facility 22. The delivery of the generated images from the remote data sensing sources 26 to the data management facility 22 is suitably performed by a file transfer protocol (FTP) or a virtual private network (VPN) over the network 30. At a block 72, the selected image/information product is generated from the received image(s) based on an image/information algorithm stored within the data management facility 22 or one that is generated by an algorithm associate 28.

Referring now to FIG. 2B, at a block 76 the generated image/information product is delivered to the customer. Delivery of the image/information product to the customer is automated and can be performed in a number of ways, such as without limitation storing the image product on a digital video disk (DVD), DVD-RAM, writable computer disk (CD-R), digital linear tape (DLT), or an advanced intelligent tape (AIT). Also, the generated image/information product can be delivered electronically via an email link, FTP, VPN, or some other electronic transfer means.

At a decision block 78, if the image/information product was generated by associate's algorithm, then at a block 80 a royalty is sent to the corresponding associate based on a previously defined business arrangement between the associate and the owner of the data management facility 22. At a block 82, a payment transaction for the service provided to the customer is executed.

The image data/information that is transferred from the remote data sensing source systems 26 to the data management facility 22 can be one of a number of common image formats, such as without limitation, geotiff, DjVu, CAP, tiff, or jpg. CAP (Centre d'Archivage et de Pretraitement) is the format of the "SPOT scene" digital products. CAP format is also a source format used for the Digital Multi-spectral Video System Mark III. DjVu is an open standard image compression technology developed by AT&T and used by LizardTech Inc. resulting in a compressed image.

FIGS. 3-6 illustrate screen shots of graphical user interfaces that are accessed by customers at the customer systems 24 that are generated by the data management facility 22 and accessed over the network 30. It will be appreciated that access to data displayed via graphical user interfaces through a secure password protected connection only allows registered customers' access.

Figure 3:
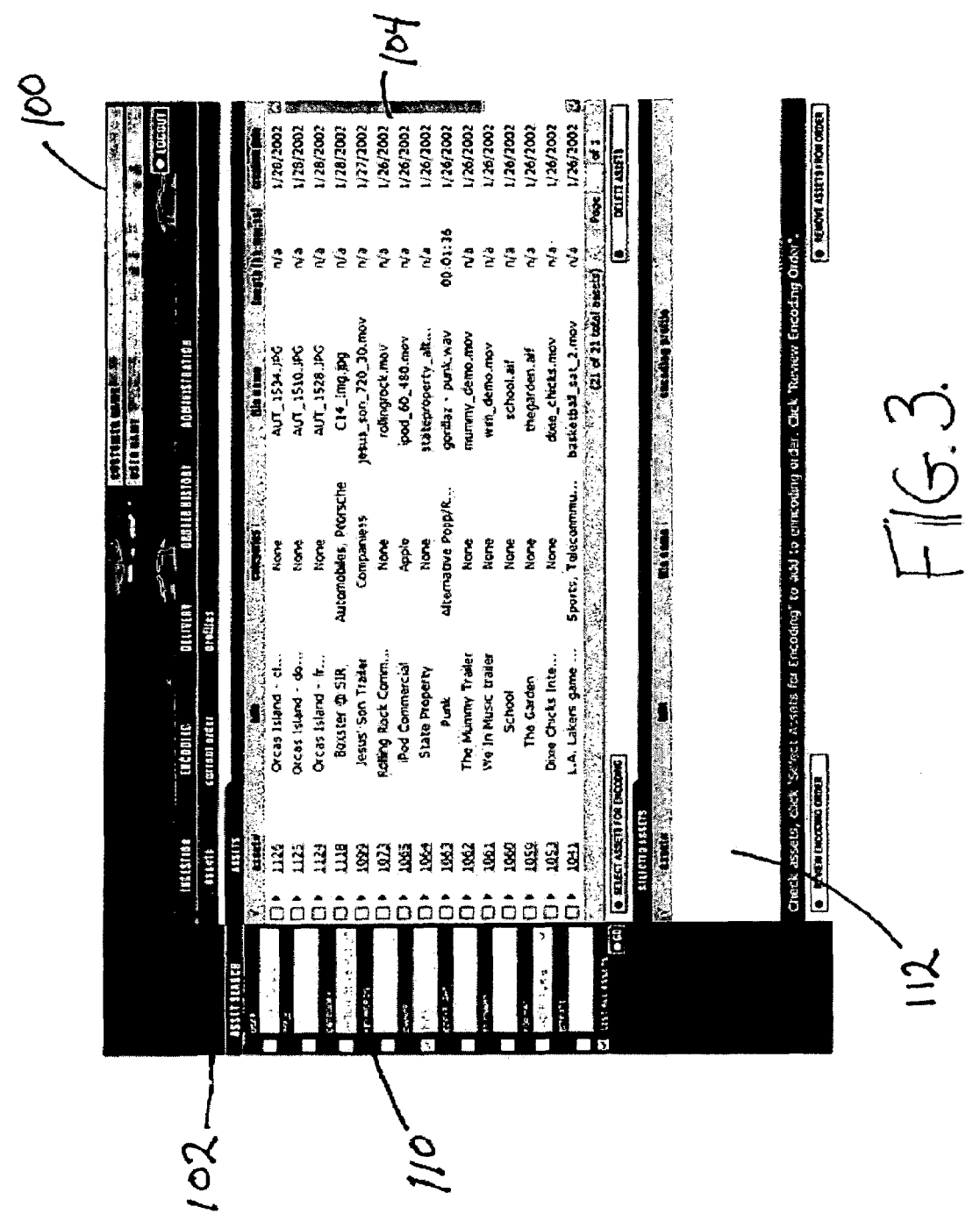

Referring now to FIG. 3, a main page 100 of the graphical user interface generated by the data management facility 22 is shown.) The main page 100 includes a tabs area 102 that presents various information depending upon the subject associated with the associated tab. In one embodiment, the main tabs include ingestion, encoding, delivery, order history, and administration. Located below the tabs section 102 is an image/information section 104. The information section 104 presents information of a tab selected from the tabs area 102. A tab is selected by using a user interface device, such as without limitation a keyboard, a mouse, a pointing device, or a touch sensitive screen that is included within the customer system 24. Adjacent to the information area 104 is a search engine interface 110. The search engine interface 110 includes a plurality of fields for entering keyboard information related to those fields. The user searches for the desired image product by entering key word information into the search engine interface 110 or by selecting a subheading titled "assets" under the "encoding" tab in the tab section 102. A list of information products available to the customer in a scrollable table format includes the following columns. In one embodiment, these columns include asset number, title, categories, file name, length (time), creation date, a detailed (expansion) button, and an "add to cart" checkbox. In another embodiment, these columns might include order number, latest images per customer profile, any news or information about the service, any added features or offerings, a link to a short-list of thumbnails.

A selected asset section 112 illustrates all the assets that have been selected from a displayed in the information section 104. The selected asset section 112 is similar to what is considered a shopping cart as used in many other e-commerce applications.

Figure 4:
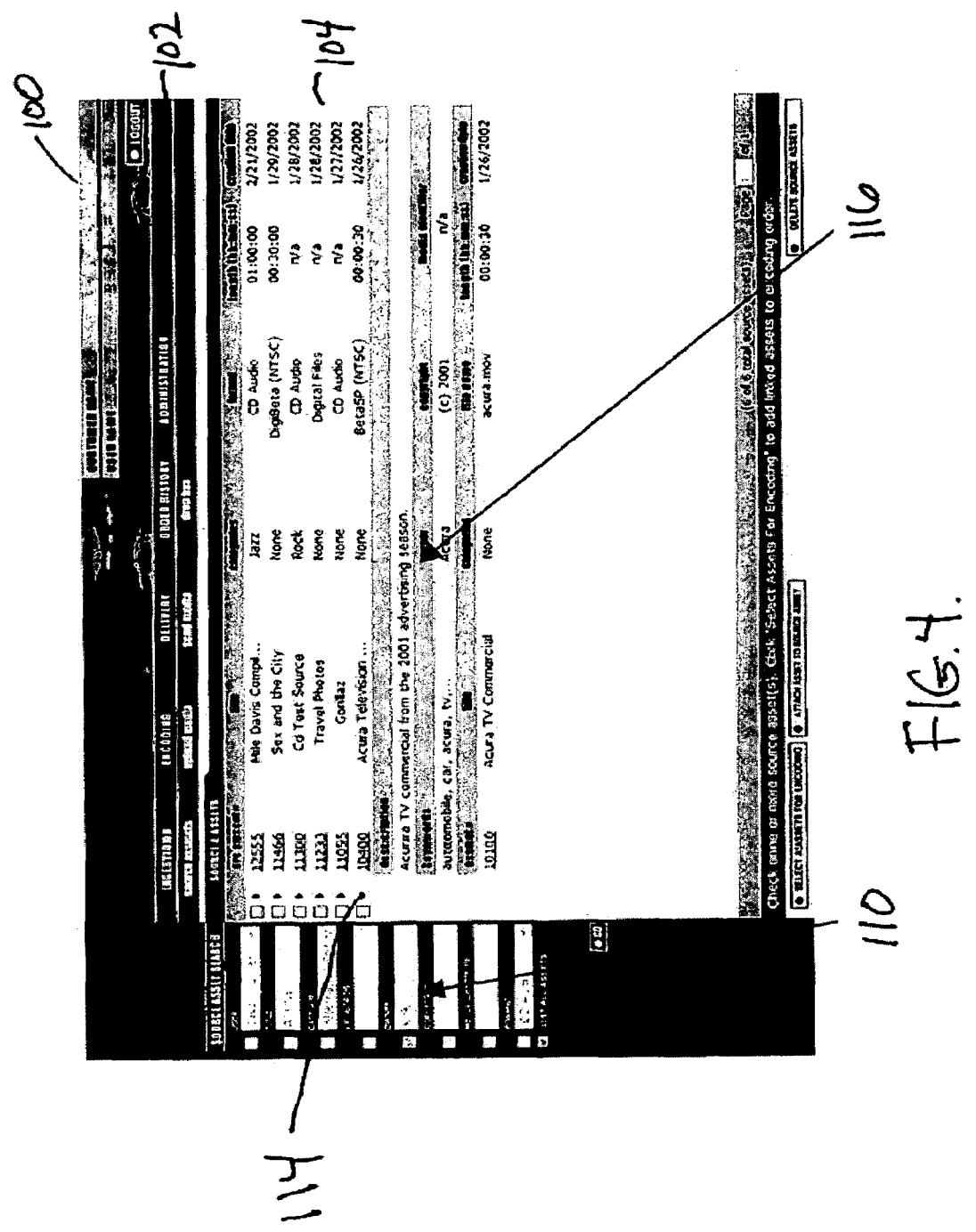

Referring to FIG. 4, each asset displayed within the information section 104 can be expanded by selecting an expanding button 114 for displaying more detailed information 116 of an expanded asset. For example, some of the detailed information 116 that can be shown after selection of the expanding button 114 includes: metadata types such as creation date, copyright date, data source (e.g. LandSat5, LandSat7, MODIS, etc), title, description, geographical location/region, type of image (e.g. Agricultural, Radar, Aerial), and thumbnail of image.

Figure 5:
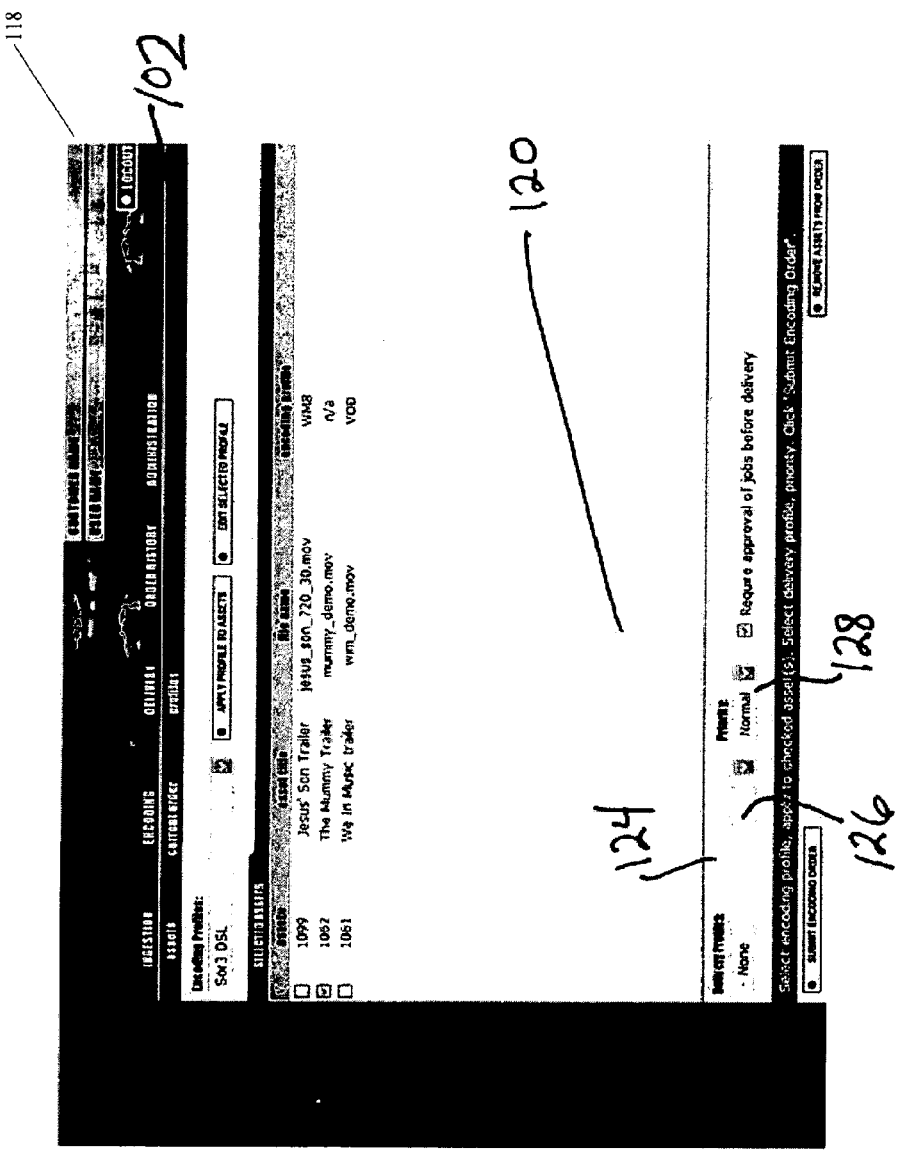

Referring now to FIG. 5, a current order window 118 is illustrated. The current order window 118 is presented upon selection of a current order tab included under the encoding tab from the tab section 102. Located below the tab section 102 is a selected assets information section 120 and contained within that is a delivery section 124 that includes a delivery profiles field 126 and a priorities field 128. The delivery profiles field 126 is a pull-down menu that allows selection of a number of predefined delivery profiles, such as DVD-R, CD-R, AIT, DLT, VPN, FTP (push or pull), Fed-EX, USPS, UPS, courier, or email. The priority field 128 is a pull-down menu that allows selection of the following delivery priorities, such as overnight, business partners priority, 1-2 business days, 5-7 business days, 14 business days.

Figure 6:
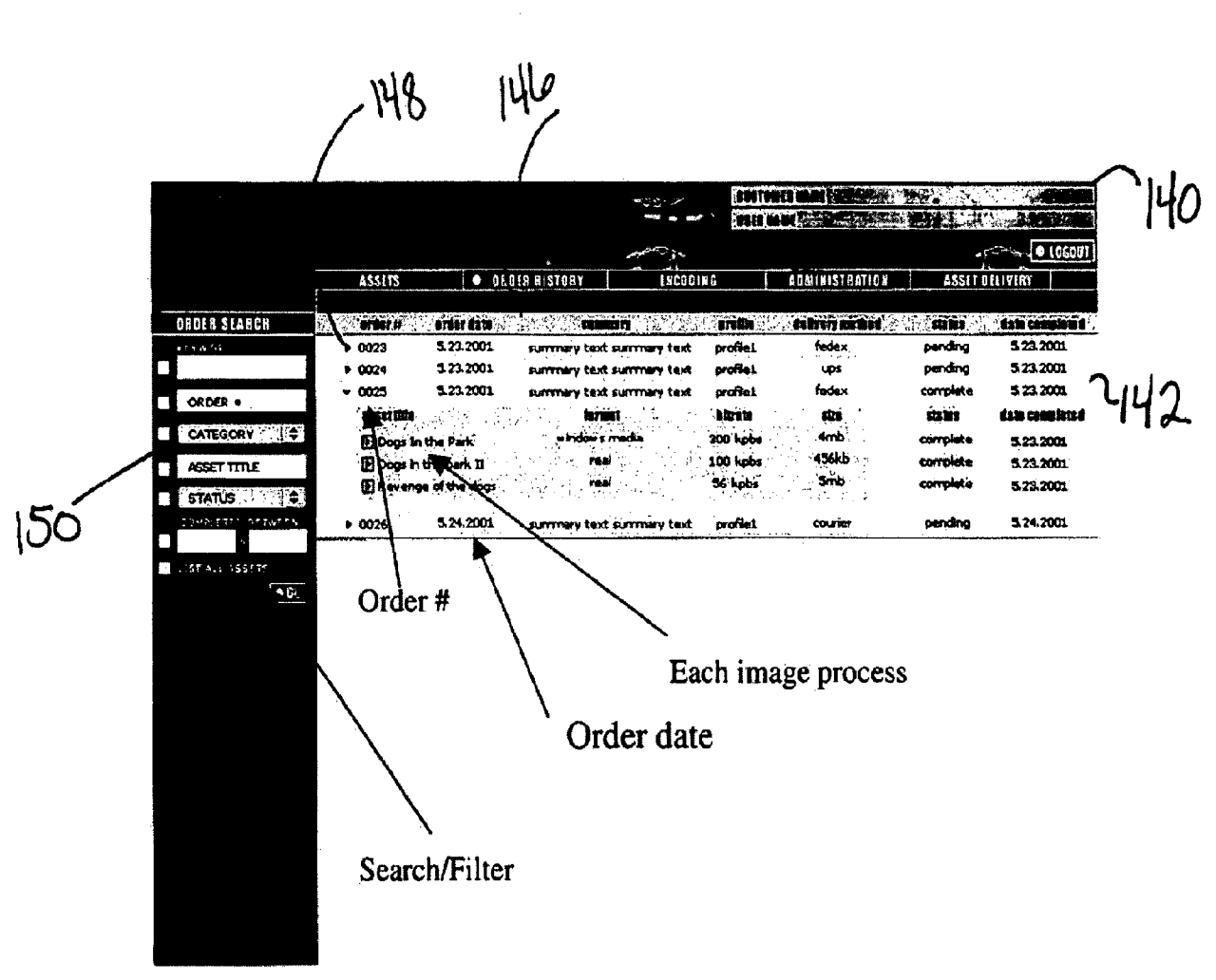

FIG. 6 illustrates an order history page 140 that includes an information area 142 for displaying a table 146 of previously submitted orders. The table 146 includes order number, order date, summary of the order, profile of the order, delivery method, present status of the order, and date in which the order was completed. Each of the displayed orders can be expanded by selection of an expansion button 148 to show more detailed information about each order. The more detailed information includes title of the asset, format, bit rate, size, status, and date completed. In another embodiment, the table 146 might include order number, order type, image name, image data source, breakdown of jobs, order date, completion date, method of delivery, delivering to address, description, image source region or geographical location. Located adjacent to the order information area 142 is a search engine user interface 150 that allows a user to enter key words in certain categories for searching information listed in the order information area 142.

Figure 7:
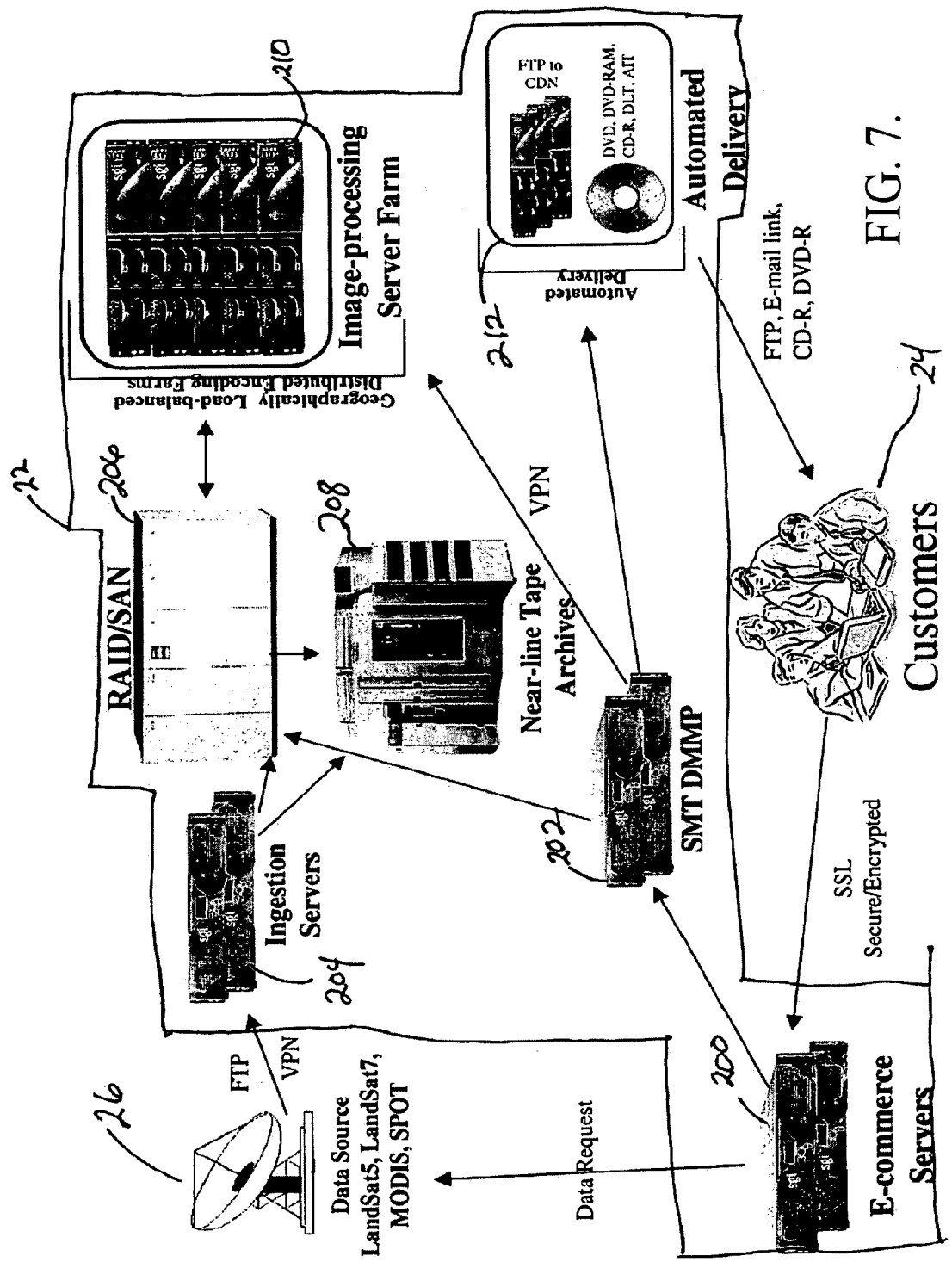
FIG. 7 illustrates a component diagram of a data management facility that is part of the system shown in FIG. 1.

Referring now to FIG. 7, exemplary components of a data management facility 22 are illustrated. In this embodiment, the data management facility 22 includes one or more e-commerce servers 200, one or more distributed media management platforms (DMMP) 202, one or more ingestion servers 204, a redundant array of inexpensive disks/storage area network (RAID/SAN) 206, near-line tape archives 208, and a plurality of image processing servers 210. The plurality of e-commerce servers 200 supports the graphical user interface as described above for receiving customer requests for image/information products and for sending customer requests to the remote data sensing source systems 26 and the DMMP 202. The ingestion servers 204 are coupled to the RAID/SAN 206 and the near-line tape archives 208. The DMMP 202 (such as that produced by Streaming Media Technologies) is coupled to the RAID/SAN 206 and the plurality of image processing servers 210 and an automated delivery component 212. The automated delivery component 212 includes components for packaging and delivering information products electronically via various means, such as without limitation FTP or a VPN. Also, the automated delivery component 212 may include devices for storing the information products onto a removable storage device, such as a DVD or a CD.

The ingestion servers 204 are used to support the migration of data by pushing or pulling the data into an application or platform. For example, the ingestion server 204 may pull in the image data from other data centers, such as the EROS Data Center in Sioux Falls, South Dakota via FTPs or VPNs.

The DMMP 202 is the control center of the data management facility. Orders are fulfilled by the DMMP 202. The DMMP 202 setups the tasks to be performed to produce products (e.g. sharpened images, geo-registered images, etc.) requested by customers. The DMMP 202 kicks off the image processing activities to produce end products or pulls archival data as needed. The DMMP 202 requests CD's or DVD's to be made or request products be delivered via an FTP.

The RAID/SAN 206 system is a storage/network system where recently acquired images and/or processed images can be stored and quickly accessed. RAID (Redundant Array of Independent (or Inexpensive) Disks ) systems are used to improve performance or provide some level of fault tolerance. SAN (Storage Area Network) supports the transfer of large quantities of data to and from multiple disk arrays.

Image processing can result in large quantities of data (~20-35 GB). There is only so much disk space available. Near-line tape archives 208 can be used as "cheap" storage devices. Once a source image has been processed, the resulting files can be off-loaded from disk to tape. Access to the data is not as fast as RAID/SAN 206 but it is faster than loading an off-line archival tape that requires operator support.

The image processing server farm 210 is an intensive number crunching system. The image processing server farm 210 executes algorithms that result in the end data products. For example, these algorithms will generate pan sharpened data, reflectance data, and/or augmented data.

The algorithm associate systems 28 are coupled to the plurality of image processing servers 210. The plurality of image processing servers 210 are coupled to the RAID/SAN 206.

This architecture is an open ended system which can support the integration of new and emerging technology. For example, it can be provide decision support tools to assist Homeland Security, Crop Insurance, Commodities, Government Agriculture, and Census Bureau. It can be readily expanded to accept other data sources using models, simulations and other sources of observations (e.g. climatologically data, change detection, etc.) to generate data quality products. It has been designed to be adaptable to any product that would be developed. The power of this architecture is its flexibility with respect to independence of data sources and algorithms. Built into this architecture is the ability to match customer requirements with existing sources and algorithms and be able to identify whether the customer's requirements could not be satisfied with existing sources and algorithms. By producing ancillary data, we are then able to enhance the overall value to the system.

The image data product that a customer desires might require a correlation of images from a plurality of satellites. An example correlation system and process are described in copending U.S. patent application Ser. No. 10/721,212, filed Nov. 25, 2003, which is hereby incorporated by reference.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is

1. A method of providing an information service, comprising:
  using a server to host a web site to receive a customer request for information about a specified change at a specified geographical location over a specified period of time;
  accessing correlated, real-time images of the specified geographical location, the images captured over the specified time period by at least one remote data sensing source that is airborne or space-based, wherein the correlated images have been processed to be spatially matched and spectrally corrected;

using a computer to process the correlated images with an algorithm to extract the information about the specified change at the specified geographical location over the specified time period; and delivering the extracted information.

2. The method of claim 1, wherein accessing the real-time images, processing the correlated images, and delivering the extracted images are performed automatically.

3. The method of claim 1, wherein the extracted information is delivered via the Internet.

4. The method of claim 1, wherein the algorithm is searched locally and, if not found, is requested from a third party.

5. The method of claim 1, wherein the algorithm is searched locally and, if not found, developed to satisfy the customer request for information.

6. The method of claim 1, wherein the real-time images are requested from more than one satellite.

7. The method of claim 1, wherein the extracted information is supplemented with information from non-remote sensing sources.

8. The method of claim 1, wherein the algorithm extracts information about climate at the specified geographical location.

9. The method of claim 1, wherein the algorithm extracts information about changes in commodities at the specified geographical location.

10. The method of claim 1, wherein the algorithm extracts information about changes in agricultural data at the specified geographical location.

11. The method of claim 1, wherein the algorithm extracts information about changes in security data at the specified geographical location.

12. An information system comprising:

means for providing a network-based interface that prompts a customer to request information about a specified change at a specified geographical location over a specified period of time;

means for accessing real-time satellite images of the specified geographical location, the images captured over the specified time period;

means for spatially matching and spectrally correcting the satellite images; and means for processing the matched/corrected images with an algorithm to extract the information about the specified change at the specified geographical location over the specified time period.

13. An information system comprising at least one server for providing a network-based interface that prompts a customer to request information about a specified change at a specified geographical location over a specified period of time; accessing correlated, real-time images of the specified geographical location, the images captured over the specified time period by at least one remote data sensing source that is airborne or space-based, wherein the correlated images have been processed to be spatially matched and spectrally corrected; and processing the correlated images with an algorithm to extract the information about the specified change at the specified geographical location over the specified time period.

14. The system of claim 13, wherein accessing the correlated images includes instructing at least one satellite to capture images of the specified geographical location over the specified time period; and spatially matching and spectrally correcting the captured images to produce the correlated images.

15. The system of claim 14, wherein accessing the correlated images further includes finding at least one satellite to capture images.

16. The method of claim 1, wherein accessing the correlated images includes instructing at least one satellite to capture images of the specified geographical location over the specified time period; and spatially matching and spectrally correcting the captured images to produce the correlated images.

17. The method of claim 16, wherein accessing the correlated images further includes finding at least one satellite to capture images.

* * * * *

UNITED STATES PATENT AND TRADEMARK OFFICE
CERTIFICATE OF CORRECTION

PATENT NO. : 7,657,124 B2  
APPLICATION NO. : 10/789084  
DATED : February 2, 2010  
INVENTOR(S) : Turner et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this

Thirtieth Day of November, 2010

David J. Kappos  
*Director of the United States Patent and Trademark Office*